United States Patent [19]

Birrell

[11] 3,896,940

[45] July 29, 1975

[54] PART PRESENTER

[75] Inventor: Kirk E. Birrell, Bellbrook, Ohio

[73] Assignee: The Bendix Corporation, Southfield, Mich.

[22] Filed: Jan. 30, 1974

[21] Appl. No.: 438,075

[52] U.S. Cl............ 214/8.5 D; 214/1 BV; 214/6 M; 214/147 T; 221/211
[51] Int. Cl.².......................................... B65G 59/04
[58] Field of Search............ 214/8.5 D, 8.5 R, 6 M, 214/147 T, 1 BV; 221/13, 124, 211, 212

[56] References Cited
UNITED STATES PATENTS

| | | | |
|---|---|---|---|
| 2,626,038 | 1/1953 | Smith | 214/6 M X |
| 2,930,476 | 3/1960 | Andrews | 214/1 BV X |
| 3,406,837 | 10/1968 | Kirsch | 214/1 BH |
| 3,513,791 | 5/1970 | Fulp | 214/1 B X |
| 3,575,302 | 4/1971 | Cafolla | 214/1 BD |
| 3,758,365 | 9/1973 | Schilling | 214/147 T X |

*Primary Examiner*—Albert J. Makay
*Assistant Examiner*—George F. Abraham
*Attorney, Agent, or Firm*—John R. Benefiel

[57] ABSTRACT

A part presenter including a plurality of part storage bins arranged in tiers adjacent a slide chute and individual transfer devices mounted over the bins and including pickups which can be projected into the bins to pick up a part and transfer it to the slide chute. Parts fall from the chute into a pusher device which moves the part to a staging location, opens and returns for the next part. Transfer devices drop parts on receipt of external signal, then go back to the bin for another part. The bins are shifted relative to the transfer device and chute support frame to ensure depletion of parts. Control circuitry is disclosed.

14 Claims, 10 Drawing Figures

PATENTED JUL 29 1975

3,896,940

SHEET 1

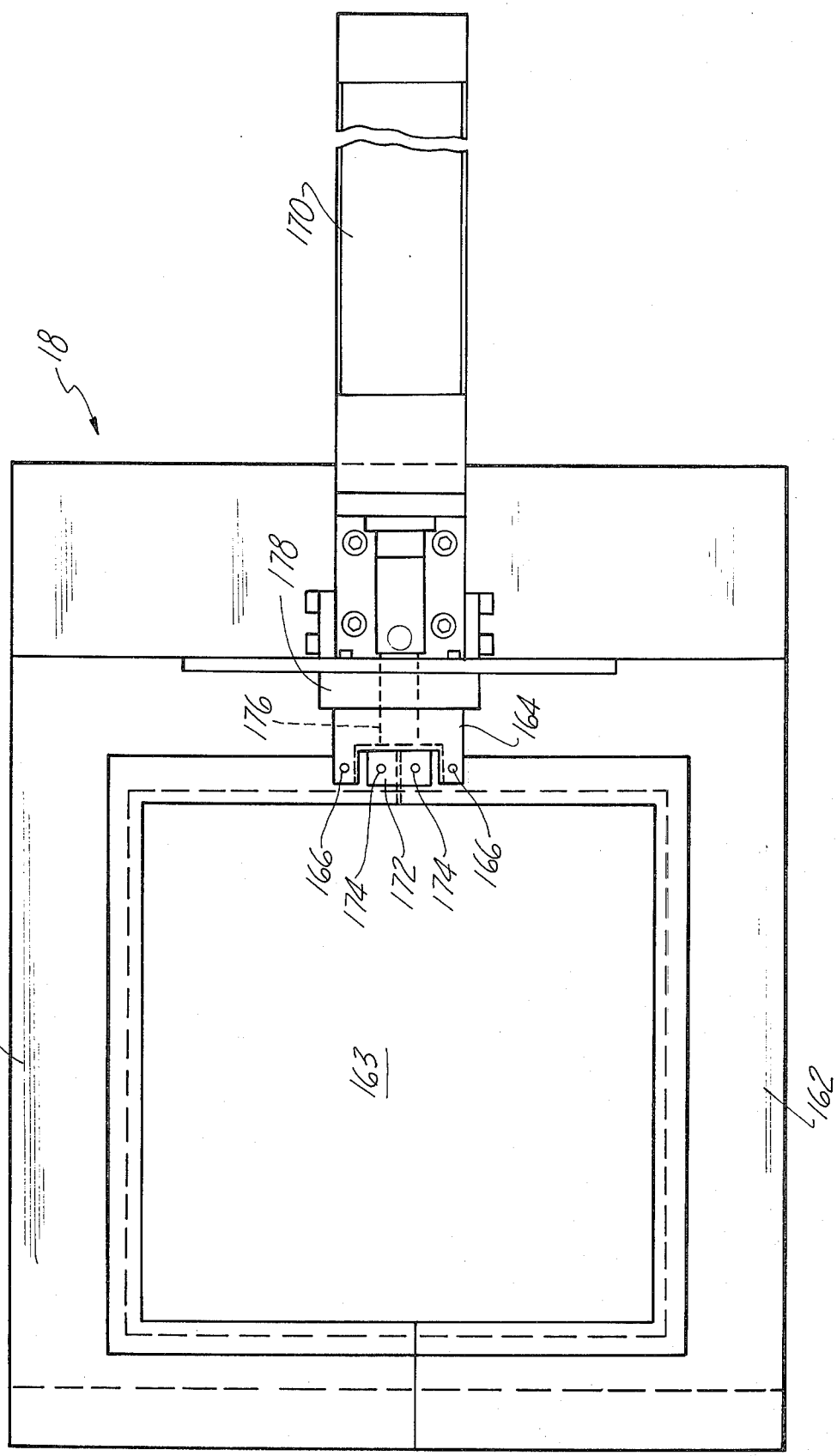

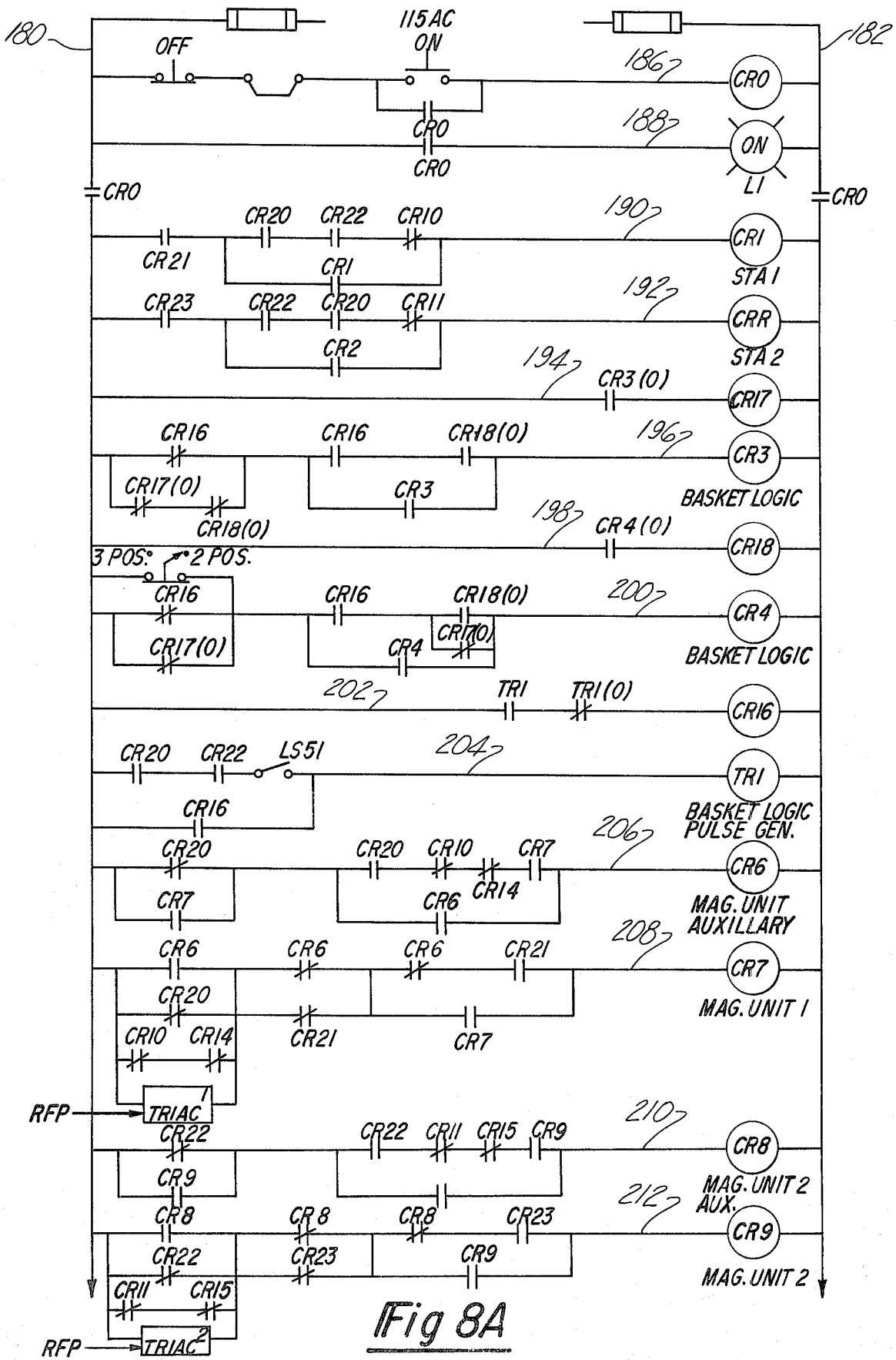

PART PRESENTER

INTRODUCTION

This invention relates to apparatus for successively and singly presenting individual parts from a plurality of storage locations for similar or different parts to a staging location from which the parts may be introduced into an automatic or semiautomatic assembly operation. This invention may be used as a part of the "general purpose automatic presenter system" disclosed in U.S. Pat. No. 3,804,270.

BACKGROUND OF THE INVENTION

Many technical developments are currently being made in the field of automation, specifically toward the development of apparatus for performing routine, repetitive transfer and/or assembly operations. This invention relates to an apparatus for presenting, on command, similar or different parts from a plurality of separate storage locations and for successively locating such parts in a reasonably small and well defined staging location within which the parts may be identified and specifically located for automatic transfer to an assembly area. The invention substantially performs the heretofore manually performed operations of selecting the individual parts to be presented and conveying them to the staging location.

BRIEF DESCRIPTION OF THE INVENTION

The parts presenter of the subject invention performs the functions of continuously asynchronously moving respective transfer devices or pickups into respective storage locations, such as parts bins, and transferring picked-up parts to a ready position proximate a part conveyance, placing selected parts singly and successively on the conveyance, and, on command, conveying the part to a terminal point. In accordance with a preferred embodiment of the invention, parts are thereafter selectively transferred from the terminal point to a staging location where they may be identified, reoriented, etc. The pickup device from which the part is released immediately reenters its storage bin and transfers another part to the ready position.

In general, the function of the present invention is accomplished by means of an apparatus comprising a part conveyance, such as an inclined slide, having a terminal point which is adjacent, but spaced from a staging location, a support means, such as a frame, stand, or the like, a plurality of storage bins or the like disposed on the support means at spaced points adjacent the part conveyance, a plurality of part transfer devices of selected character disposed on the support means and over the storage bins for continuously and asynchronously transferring parts from the associated bins to a ready position over or otherwise adjacent the conveyance. In its preferred form, the invention further comprises a short stroke part pusher for discretely displacing parts from the terminal point of the conveyance to the staging location and returning to the terminal point for the next part; the parts pusher being optional as preferred and advantageous, but unnecessary in some circumstances. As hereinafter described in greater detail, the parts presenter of the subject invention is readily adapted to and integrated into a highly sophisticated automatic assembly procedure involving computer controller apparatus of diverse character.

Further features of the parts presenter of the subject invention include a control system which results in the automatic asynchronous actuation of the individual part transfer devices or pickup devices to pickup and retrieve parts from the storage bins and to further respond to outside signals to individually release the retrieved parts onto the part conveyance, thereafter to automatically return to the pickup position. In accordance with the preferred embodiment hereinafter described in greater detail, the transfer devices comprise bidirectional actuators, such as double-acting fluid cylinders, pickup devices, such as electromagnets and vacuum grippers, displaceably carried on the output member of the fluid cylinders, cam means operatively connected with the pickups for causing the pickups to be guided between a first end position within the associated storage bin and a second end position over, or otherwise adjacent, the part conveyance. Signal generating devices, such as load cells and limit switches, are provided for determining the points in time during which the pickup means arrives at the first and second end positions, the first end position being variable over a fair range to permit part pickup operations at each of a succession of changing part locations and further means for determining whether or not a part has been, in fact, picked up.

The preferred embodiment of the invention further comprises means for intermittently shifting the storage locations or bins relative to the support means for the plural pickups thereby to effectively move the pickup location around within the storage bins to ensure a thorough part divestiture from the storage bins during an assembly and presentation procedure.

The various features and advantages of the subject invention will become more apparent upon reading the following specification which describes the preferred and illustrative embodiment in detail. It is to be understood that this embodiment illustrates all of the various features of the invention, but is not otherwise to be construed in a limiting sense.

BRIEF DESCRIPTION OF THE DRAWINGS

FIG. 7 is a plan view of the pusher mechanism associated with the parts presenter in the system of FIG. 1;

FIGS. 8A and 8B constitute a schematic circuit diagram of a relay control circuit for scheduling the operation of the parts presenter device of FIG. 1; and, FIG. 9 is a function flowchart useful in describing the overall operation of the system of FIG. 1.

DETAILED DESCRIPTION OF THE SPECIFIC EMBODIMENT

Figure 1:
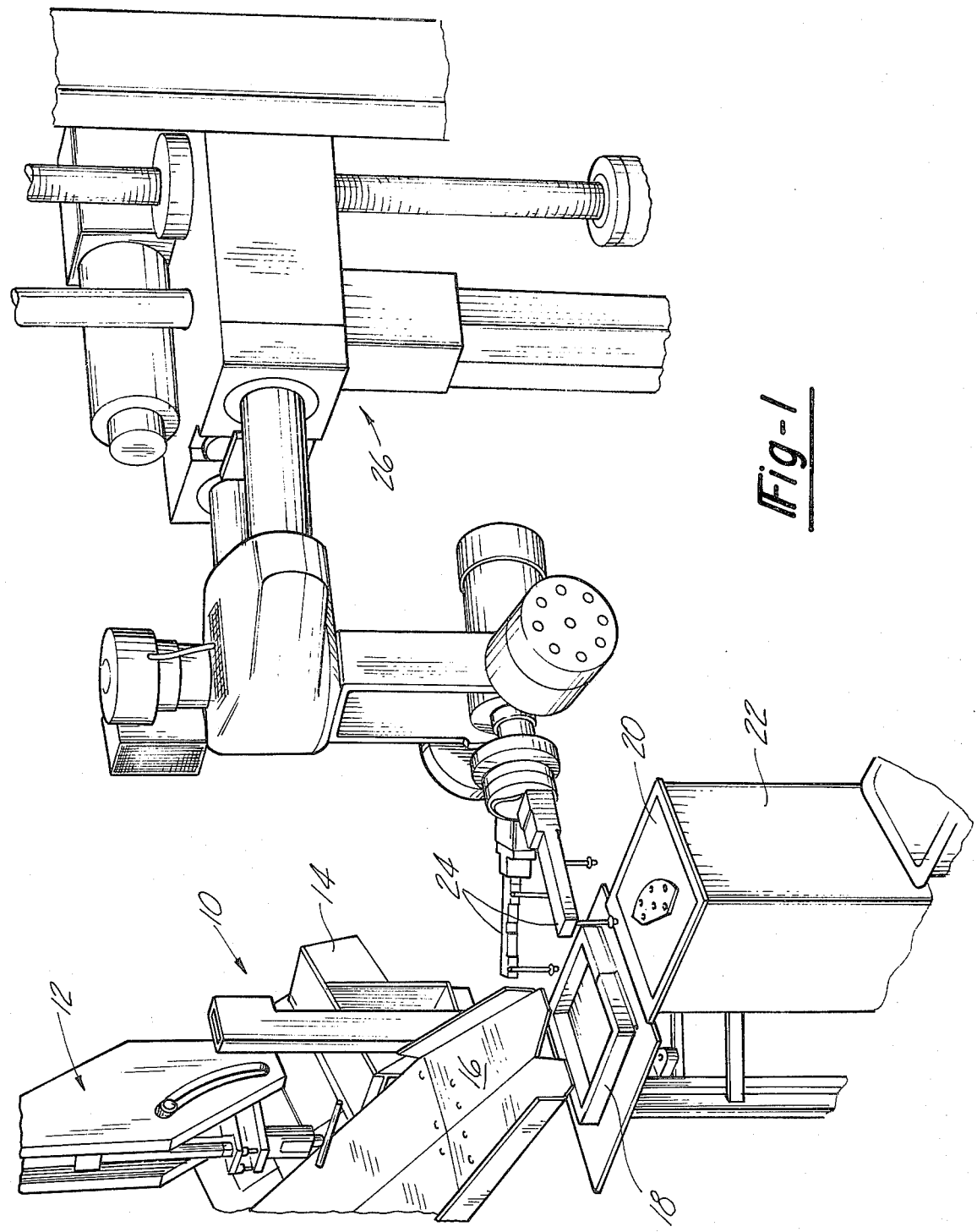
FIG. 1 is a perspective drawing on an automated assembly system embodying the parts presenter of the present invention.

Referring now to FIG. 1, there is shown a representative portion of an automatic assembly system of the type described in U.S. Pat. No. 3,804,270. This system comprises a parts presenter 10 having a plurality of transfer devices 12 for cyclically retrieving parts from part storage locations defined by bins 14 and for selectively dropping the parts onto a part conveyance in the form of an inclined chute 16. The chute 16 extends from under each of the transfer devices 12 to a terminal point which is bounded by a pusher mechanism 18 which operates to discretely push the deposited parts, one at a time, from the terminal location to a staging location defined by the upper illuminated surface 20 of a video stand 22. From the staging location, the parts are picked up by the selectively operable gripper jaws 24 of a six-axis, part manipulator 26 which is programmed to perform a part displacement and assembly operation. Again, the nature and operation of a system of the type illustrated in FIG. 1 is more fully described in U.S. Pat. No. 3,804,270.

Figure 2:
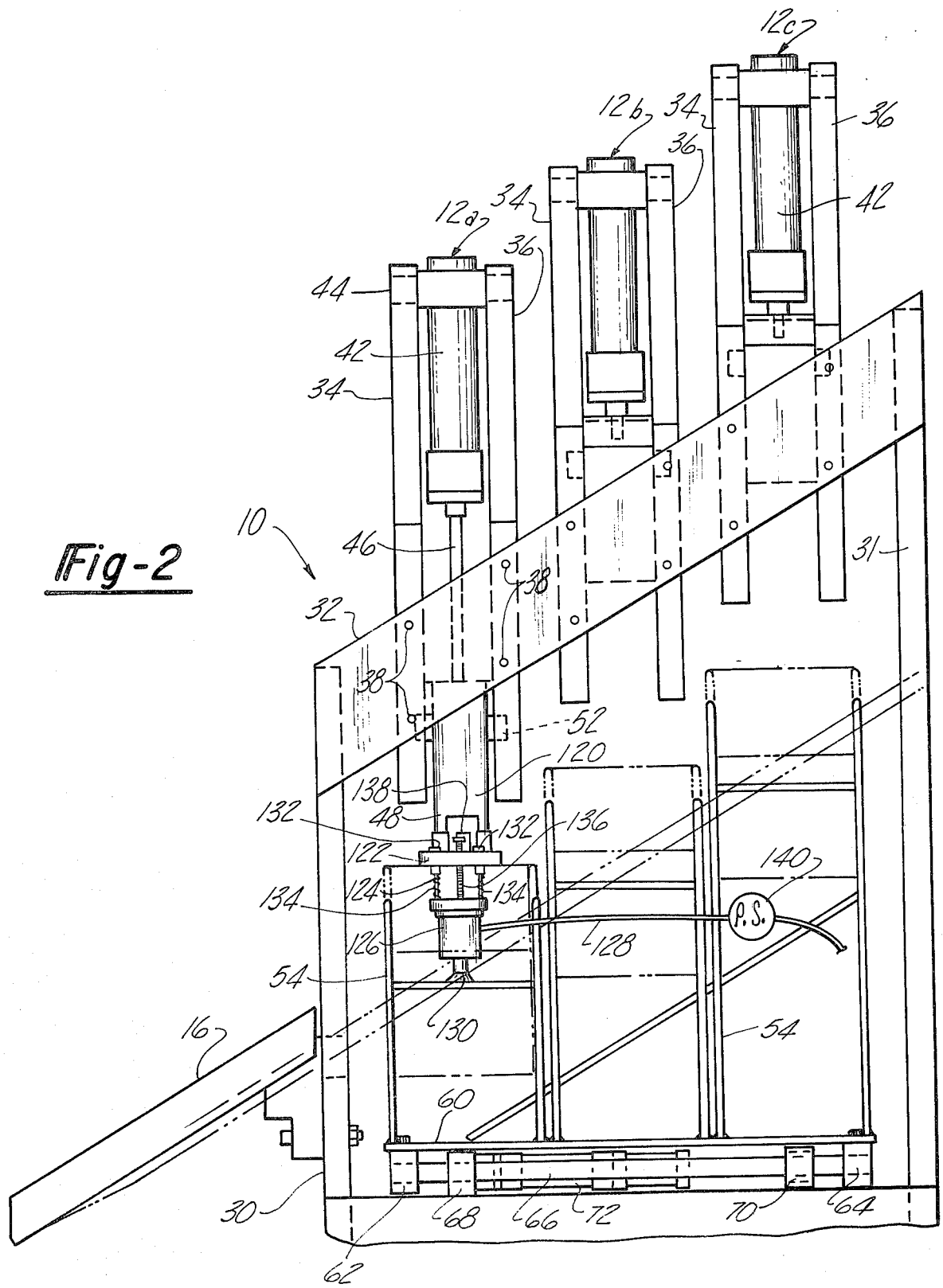
FIG. 2 is a side view of the parts presenter mechanism exclusive of the pusher mechanism.
Figure 3:
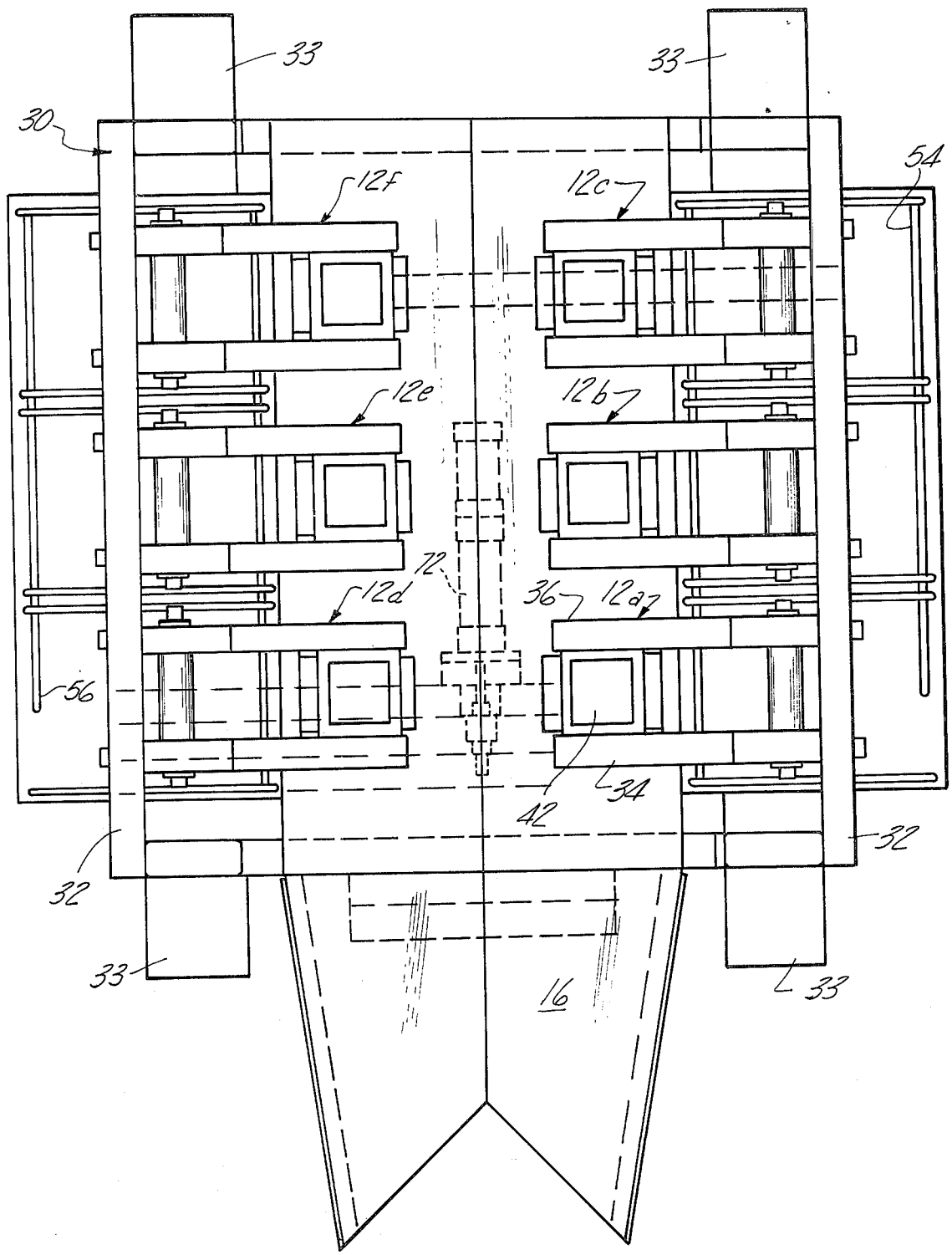
FIG. 3 is a top view of the parts presenter mechanism of FIG. 2.
Figure 4:
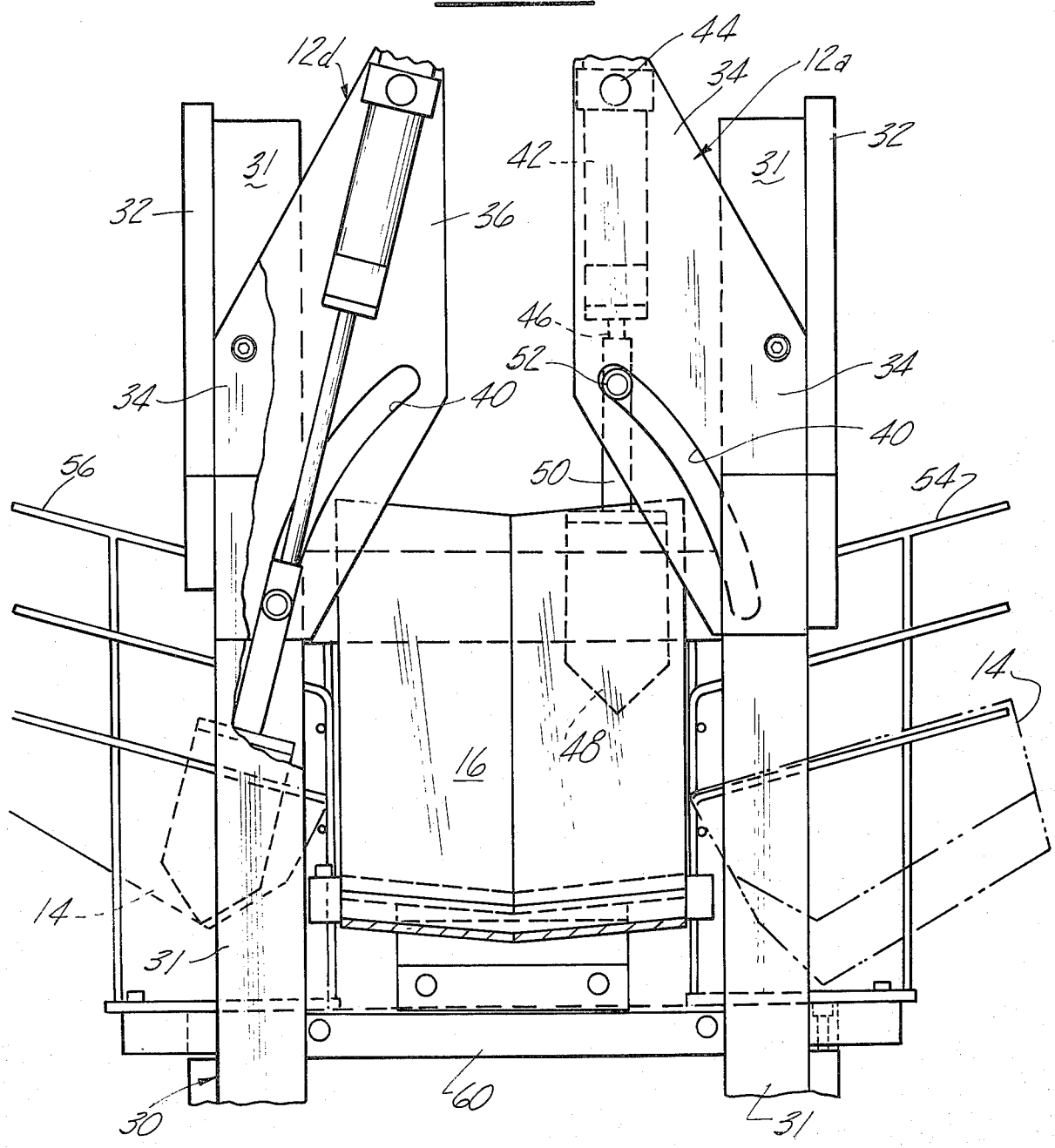
FIG. 4 is a front view with parts broken away of the presenter mechanism of FIG. 2.

Looking now to FIGS. 2 through 4, the details of the parts presenter 10 will be described. In FIGS. 2 through 4, the parts presenter is shown to comprise a rigid metal frame 30 having four vertical legs 31 terminating at the bottom end in feet 33 and joined at the upper end by inclined metal support braces 32 which extend fore-and-aft in spaced, parallel relation to one another. An inclined part conveyance in the form of a Teflon-coated metal chute 16 which also extends generally in the fore-and-aft direction, is generally parallel to the braces 32 and on a lower level, as best shown in FIG. 2. Chute 16 passes directly under each of the part transfer devices 12a, 12b, 12c, 12d, 12e, and 12f as best shown in FIG. 3 and extends to a terminal point over the rest position of the pusher mechanism 18 where parts from the bins 12 are dropped one at a time.

Each transfer mechanism 12 comprises a pair of spaced, rigid metal cam plates 34 and 36 mounted on one or the other of the braces 32 by means of machine screws 38. The transfer device 12a may be taken as representative of all of the transfer devices 12 in general, structural, and functional definition, the specific differences between the transfer devices lying primarily in the specific pickup mechanism which is employed. Two specific pickup mechanisms will be hereinafter described in detail. The cam plates 34 and 36 are generally trapezoidal in shape, as shown in FIG. 4, and each includes an arcuate, elongated slot 40 which extends from a lower end position over the associated storage bin 14 to an upper end position which is over the chute 16. Transfer device 12a further comprises an actuator in the form of a double-acting air cylinder 42 having the upper end thereof secured between the cam plates 34 and 36 by means of a pivotal bearing or trunnion 44. An extensible output shaft 46 projects downwardly from the lower end of the air cylinder body and carries at the lower end thereof a pickup device 48 which may assume any of various mechanical characters in accordance with the part to be picked up. The pickup support shaft 50 carries a cross pin 52 which is disposed within the slots 40 of the cam plates 34 and 36 to guide the lower end of the shaft 50 and the pickup 48 between a first position within the associated bin 14 and a second position over the chute 16. In FIG. 4 the transfer device 12a is shown in the second or raised position ready to deposit a part onto the chute 16 upon receipt of an external command. The transfer device 12d is shown in the first or lowered position within the associated bin 14 for a part pickup operation. A suitable air cylinder is available from the Parker-Hannifin Company of Oakland, Cal., Model No. C-DD-2A-14-C-1.5, a double-acting air cylinder having an eight inch stroke.

Figure 6:
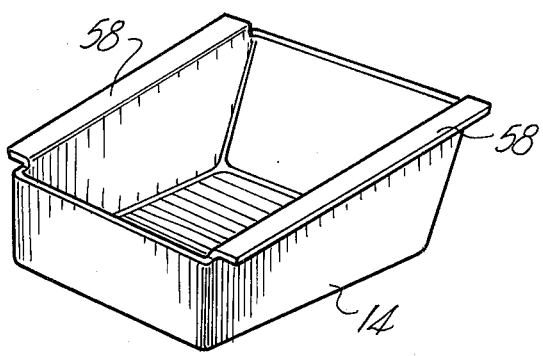
FIG. 6 is a perspective view of a storage bin usable in the assembly of FIG. 2.

The bins 14 are supported in right and lefthand tiers adjacent and along the chute 16 by right and lefthand bin support racks 54 and 56, respectively. The bin support racks are constructed from solid steel wire stock so as to receive the deep aluminum bins 14 having parallel support flanges 58 along the upper edges thereof, as best shown in FIG. 6. The racks 54 and 56 support the bins in an inclined attitude so that the parts tend to fall forwardly within the bins during the pickup process. The character of the bin support racks and the support flanges 58 allow the bins 14 to be easily placed in position and removed for substitution, filling, and so forth.

Racks 54 and 56, as best shown in FIG. 2 comprise fore-and-aft extending base plates 60 secured together by laterally extending cross member 62 and 64. Support shafts 66 are rigidly secured between the cross members 62 and 64 and extend through bushings 68 and 70 which are mounted on the support frame 30. Accordingly, the bin support racks 54 and 56 may be shifted in the fore-and-aft direction relative to the frame 30 by a matter of one or two inches upon actuation of and under the control of a double-acting air cylinder 72 which is disposed centrally between the shafts 66, as shown in FIGS. 2 and 3. Control means are provided for automatically actuating the air cylinder 72 after each part pickup attempt thereby to continuously vary the actual part pickup positions of the pickups 48 relative to the bins 14 between successive pickup strokes. In this manner, the systematic depletion of the parts within the bins 14 is assured.

The transfer device 12a, as shown in FIG. 2, employs a pickup 48 of the vacuum gripper type to pick up flat, smooth parts from the associated part bin. Pickup 48 comprises a rigid metal body 120 carrying a cross pin cam follower 52 which extends into the slots 40 of the associated cam plates 34 and 36 to guide the pickup between the bin and the slide chute 16. A cross plate 122 mounted on the end of the body 120 is provided with a plurality of holes for receiving slide pins 124 which project vertically from a vacuum plenum 126 which is attached to a suitable vacuum source by means of a vacuum line 128 to produce a gripping effect in a small, flexible rubber gripper 130 which is interconnected with the interior of the vacuum plenum body 126. The pins 124 of the plenum body 126 extend upwardly through the holes in the plate 122 and are attached to stop nuts 132 at the upper end thereof to secure the plenum body 126 to the pickup arm 120. Springs 134 urge the plenum body 126 downwardly away from plate 122 and provide a resilient resistance to relative displacement between the plenum body 126 and the plate 122. A small screw shaft 136 extend upwardly from plenum body 126 through the plate 122 and carries a small actuator tab to actuate a limit switch 138 whenever the body 126 moves vertically upward relative to the plate 122.

It can be seen that in operation the pickup 48 descends into a bin 14 to pick up a part. The level within the bin at which the gripper 130 encounters a solid surface depends on the level of parts within the bin and it is equally important to ensure that (a) the gripper 130 estends all the way to the bottom of the bin when necessary, and (b) the gripper 48 is not over-driven after encountering a solid, immovable surface. Accordingly, encountering a part while descending into the bin causes the plenum body 126 to move upwardly relative to the plate 122 against the bias force of springs 124. This trips the limit switch 138 which interrupts the descent into the bin and prevents over-driving the gripper and possibly damaging the equipment. The signal from the limit switch 138 also indicates the need to energize the gripper 130 by way of the vacuum line 28 to grasp a part and return to the ready position over the slide chute 16. A line pressure sensor 140 is operatively connected with the vacuum line 128 to sense a sudden increase in line pressure as an indication that the gripper 130 has grasped and is transferring a part.

Figure 5:
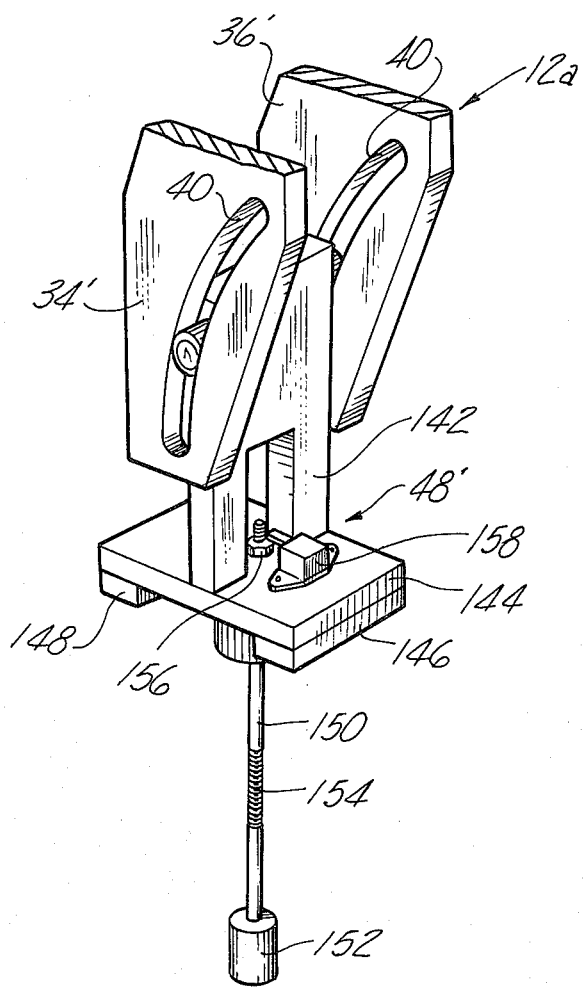
FIG. 5 is a perspective drawing of a detail of the presenter mechanism of FIG. 2 illustrating an illustrative electromagnetic pickup mechanism.

FIG. 5 illustrates an electromagnetic gripper assembly 48' which may be substituted for the vacuum gripper 48 or used on another of the transfer devide 12, shown in the multiple transfer station device of FIGS. 1 through 4. The electromagnetic pickup devices comprises a rigid pickup body 142 carried between cam plates 34' and 36' and secured to the end of the air cylinder extensor shaft so as to move between the previously defined end points for parts pickup and release. Mounting plate 142 carries a pin-type cam follower which extends into the cam slots 40 as previously described. A set of end plates 144, 146, and 148 are ridigly mounted on the end of the body 142 and are provided with a central hole which receives the pickup shaft 150 therethrough. An electromagnet 152 is mounted on the end of the shaft 150 and is interconnected with a suitable energizing source to provide an attractive force to ferromagnetic parts. Shaft 150 includes a flexible central portion 154 which may be made up of a fairly rigid coil spring to permit lateral flexibility in all directions. Shaft 150 is free to slide vertically upwardly relative to the plate assembly 144, 146, and 148 and a nut 156 on the shaft operates to trip a limit switch 158 to signal that the electromagnet 152 has contacted a part or the bin bottom during descent of the pickup 48' to the pickup position within the bin 14. Plates 144 and 146 are operatively attached to a standard strain gauge-type variable resistance load cell (not shown) to measure tension in the shaft 150 as a result of the part pickup load thereby to determine whether two few parts; i.e., none, have been picked up or too many parts; i.e., two, have been picked up. Upon receipt of the proper signal, the pickup 48' will return to the ready position over the slide chute 16.

Referring now to FIG. 7, the pusher mechanism 18 of the assembly of FIG. 1 is shown in detail. Pusher mechanism 18 comprises reversely similar rigid semi-quadrangular enclosure arms 161 and 162 which together make up a quadrangular enclosure of such interior dimensions as to receive any of the various parts from the bins 14 therein. The typical depth of the pusher mechanism is 1 to 2 inches, sufficient to prevent the typical part from falling outside of the pusher area. The interior surface 163 of the pusher area is typically stainless steel, dense ceramic, or such other long-wearing material as may be found desirable. Semiquadrangular arms 161 and 162 are connected to pusher bracket 164 at first pivot points 166 thereby to permit the pusher enclosure to be displaced linearly and reciprocally relative to the slide surface 163 under the control of a double-acting air cylinder 170. In addition, semiquadrangular arms 161 and 162 are pivotally connected to connector 172 at pivot points 174, the connector 172 being disposed on the end of the output shaft 176 of a second double-acting air cylinder 178. Cylinder 178 is of the "pancake" type whereas the cylinder 170 is a more conventional cylindrical configuration. In operation, the pusher mechanism 18 is actuated whenever a part has been received within the enclosure defined by the arms 161 and 162; i.e., on the surface 163. The cylinder 170 is then actuated to displace the pusher enclosure forwardly over vision station 20, shown in FIG. 1. At this point, cylinder 178 is actuated to push the connector 172 outwardly. It can be seen that driving the pivot points 174 outwardly along the longitudinal axis of cylindrical actuator 170 causes arms 161 and 162 to rotate about the pivot points 166 separating from one another and opening the far end of the enclosure. At this point, cylinder 170 is actuated in the opposite direction to withdraw the pusher mechanism 18, the open ends permitting the part to remain on the vision surface 20 while the pusher mechanism is withdrawn. Upon returning to the terminal position under the slide chute 16, double-acting cylinder 178 is reactuated to close the jaws.

It is to be understood that the principal advantages of the pusher are to avoid damage to the surface 20 of vision unit 22 and to assure a reasonably uniform orientation and location of the parts for presentation to gripper jaws 24. There are, of course, applications of the parts presenter 10 which would not require the pusher 18 as, for example, where the receiving surface 20 is durable and provides a suitable stopping function to parts from chute 16.

Referring now to FIG. 8, a relay circuit ladder diagram is shown as an implementation of an overall control system for the parts presenter 10 including the pusher mechanism 18. While a conventional relay-type circuit is disclosed, it is to be understood that various electronic implementations of equivalent or substantially equivalent function may be employed.

The ladder diagram of FIG. 8 includes graphic representations of electrical conductors 180, 182 across which all of the various solenoid and contact circuits are connected in parallel to be energized by a 115-volt ac source, as shown.

The ladder diagram symbols include fuses, push-button switches, limit switches, contacts, and controllers indicated by the letters CR, solenoid indicated by "SOL", lights, triacs, and other prominently labeled components all of which are illustrated in standard, conventional fashion and will be clearly recognized by those skilled in the art of relay circuitry. Moreover, the master-slave relationship between controllers and contacts are indicated by corresponding numbers as will also be recognized as conventional practice by those skilled in the art. Accordingly, the description of circuitry in FIGS. 8A and 8B may be kept brief, the circuit diagram itself carrying the balance of information necessary to relate the circuit to the mechanical apparatus thus far described.

Ladder diagram rung 186 includes the ON and OFF switches and a controller for closing contacts CRO in rung 188 to indicate that the parts presenter power is "on." Rungs 190 and 192 represent typical pickup controllers and the control relays CR1 and CR2 represent the means by which the double-acting cylinders are caused to move to the "down" position. Rungs 194, 196, 198, 200, 202, and 204 are associated with the bin shifting operation previously described and indicate a possibility of incremental shift between three, uniformly-spaced positions; i.e., two end positions and a middle position. Rungs 206 and 208 are associated with the control of the electromagnetic part pickup device 48'. Control relay No. 6 is inhibited if two parts are picked up and they are to be returned to the bin and control relay No. 7 is deenergized to cause the part to drop onto the chute 16. Rungs 210 and 212 are identical to rungs 206 and 208 and are provided for implementation of a second magnetic pickup. The triacs Nos. 1 and 2 are provided for receiving a request for part signal (RFP), this signal being effective to cause the particular part to be dropped onto the chute 16 as soon as the associated pickup reaches the ready position. This is to be distinguished from the act of directing the pickup into the bin, such pickup action being automatically initiated whenever the associated pickup has dropped its part.

Figure 8B:
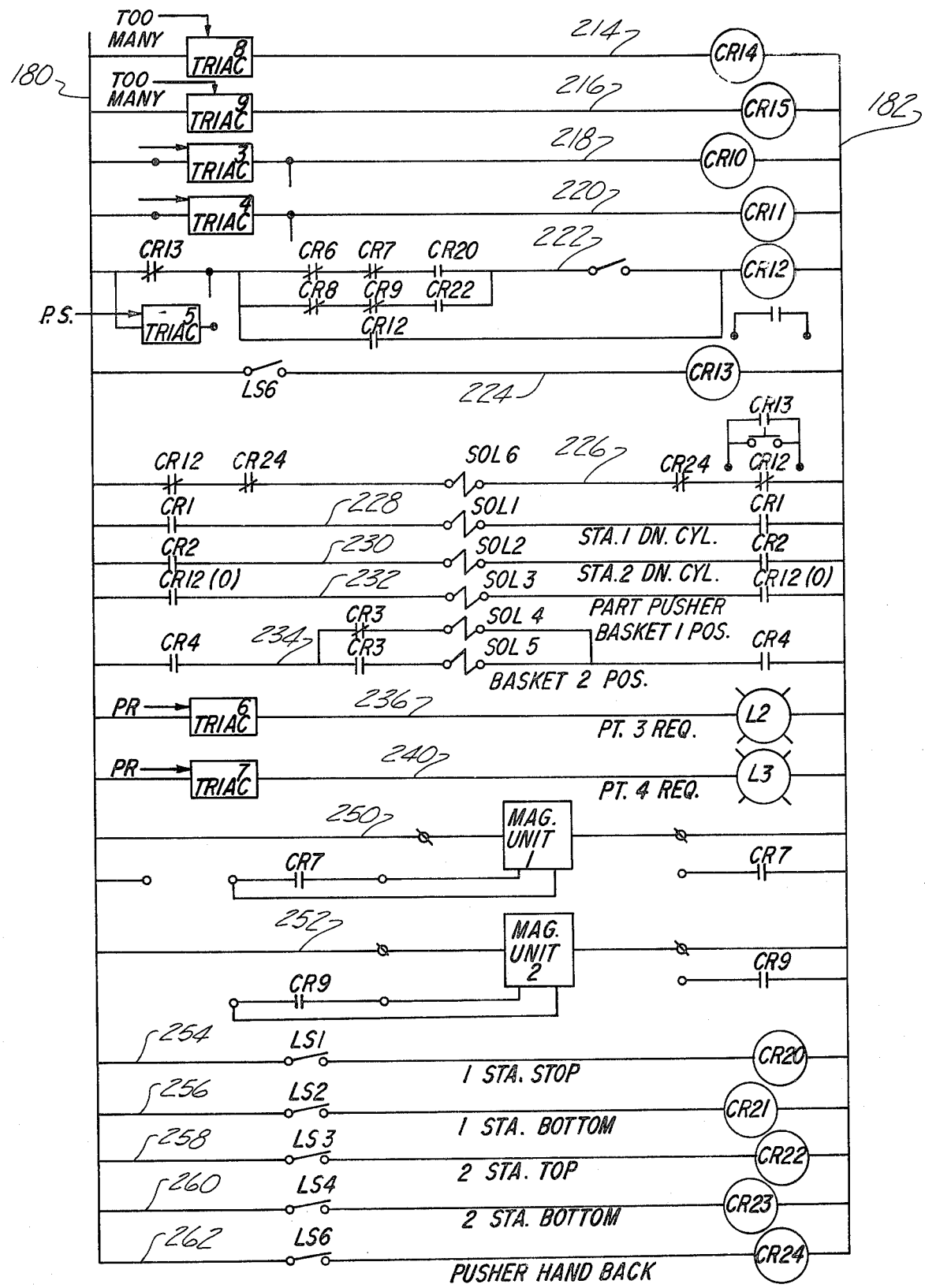

Going now to the circuitry of FIG. 8B which merely represents an extension of the circuitry of FIG. 8A, rung 214 includes a triac circuit from the pickup load cell indicating that too many parts have been picked up on the first pass of pickup 48' and rung 216 includes a second triac circuit indicating that too many parts have been picked up on the second pass of pickup 48'. Rungs 218 and 220 are pressure switches for the vacuum-type pickups and are actuated in response to line pressure variations, as previously described. In this case the associated control relays are energized to indicate an "OK" signal. Rungs 222 and 224 are associated with the part pusher 18 and include triac No. 5 which receives an external signal from the vision unit 22 indicating that the part is steady on surface 20. Limit switch No. 6 indicates that the pusher 18 is in the full forward position. Rung 226 is provided for opening the pusher jaw. Rungs 228 and 230 are control circuits for the down cylinders of respective pickup devices. Rung 232 provides the forward motion of the part pusher. Rung 234 is associated with the bin shift function. Rungs 236 and 240 are indicators and external signal recipients in the form of triacs to receive part request signals for typical pickup stations. Rungs 250 and 252 are implementations for electromagnetic pickup devices and include electromagnet units in those rungs. Rung 254 lincludes a limit switch and a control relay for implementing the function of indicating that a first pickup has reached the top position. Rung 256 indicates that the same pickup station has reached the bottom position and includes a second limit switch. Limit switch No. 2 corresponds to the limit switch previously described with reference to FIG. 5 responsive to the pickup device reaching the bottom of the bin or the top of the part stack and causing the pickup to move relative to the support body. Rungs 258 and 260 correspond to rungs 254 and 256, but are assigned to a second pickup station. It will be understood that additional pickup rungs similar to 258 and 260 may be included for the other pickup stations. Rung 262 implements the function of monitoring the return of the pusher mechanism to the initial pickup position.

It is to be understood that the relay circuitry of FIG. 8 is illustrative in nature and may be implemented in a variety of ways as will be apparent to those skilled in the control circuitry arts.

Figure 9:
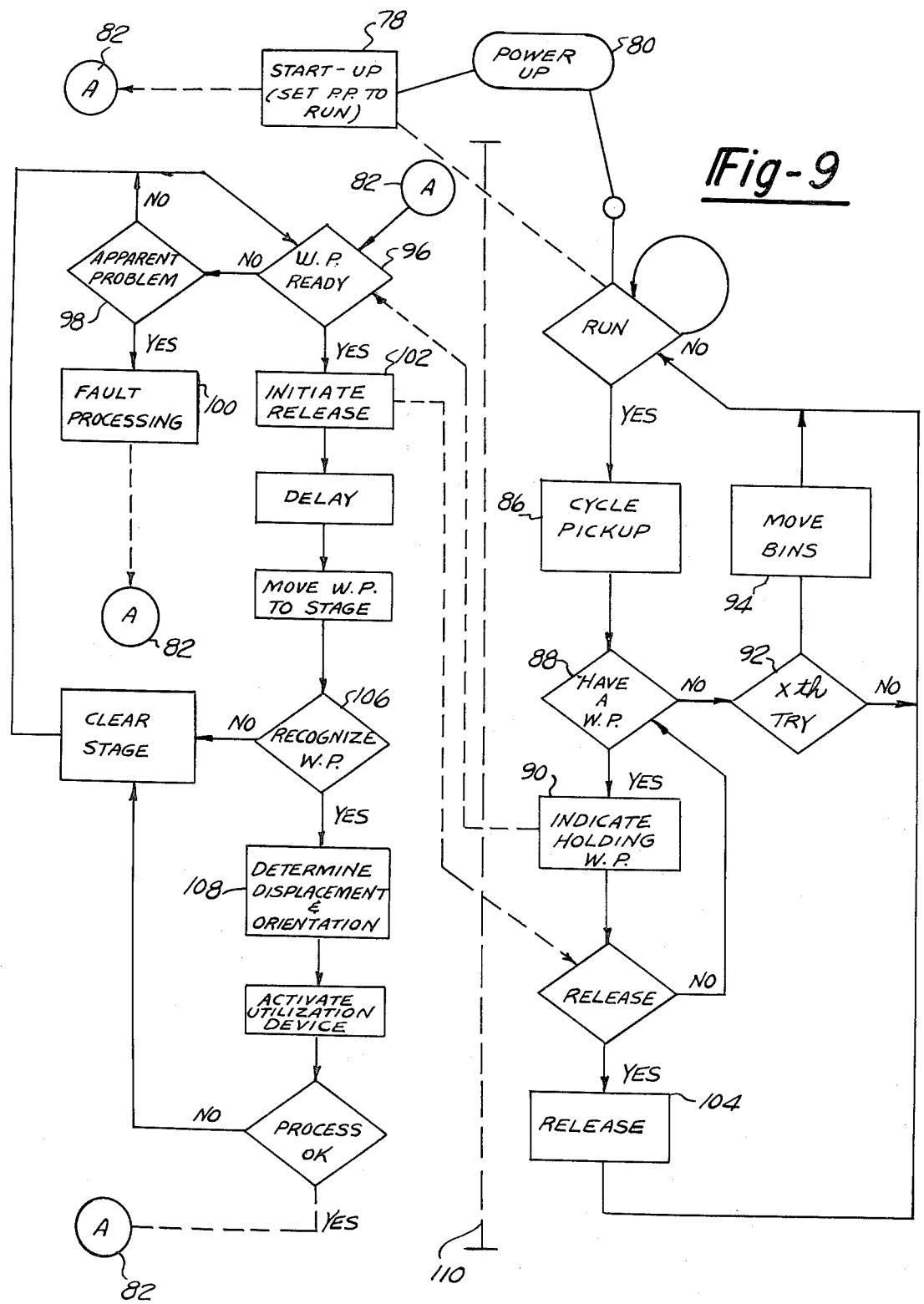

Referring now to FIG. 9, a flow sheet for a typical control system for sequencing during an assembly operation is shown. After the system is started, the internal check is made to determine the proper operational condition of the various subsystems, these checks being represented by function blocks 78, 80 and the power cylinders are cycled by means of an enable function 24 controlled by a signal from the program control 82 to pick up parts from each part storage bin 14, this function being represented by block 86.

After each such cycling, a determination is made at 88, by means of a load cell, as previously described to determine whether or not a workpiece has, in fact, been picked up. If the answer is "yes," an output signal is generated at 90 indicating that a workpiece is being held by the particular pickup device. If the answer is "no" and less than Xth try, the pickup is recycled by a feedback signal to 84. If, after the Xth try, a workpiece has still not been picked up, some corrective measure must be taken, such as moving the bins to the next bin position, as indicated by function blocks 92 and 94.

A "workpiece ready" signal is then combined in a workpiece release control function 96 with the program control function 82. If the lack of a workpiece being ready indicates a malfunction or problem as deduced from other system inputs by function 98, a "problem" signal is produced and processed in fault processing function 100 to initiate remedial steps which may involve interaction with the program control function 82. If a workpiece is indicated as being ready and the program calls for the release of the particular workpiece, the release is initiated at 102 with a subsequent fixed delay to allow for the workpiece to come to rest in the quadrangular enclosure of the pusher 18. After this, the workpiece is moved to the staging location of surface 20 by movement of the pusher device 18. After release of the workpiece at 104, the pickup cycle is repeated as indicated. The image of the workpiece on surface 20 of unit 22 is correlated with stored data in function block 106 to determine if the workpiece is the correct one; that is, whether the workpiece at the staging location is the particular one called for by the program control. If it is not, the workpiece is removed from the staging location and feeding of the proper workpiece is again attempted. If the correct workpiece appears, the image data is processed at 108 to determine the workpiece position on the staging unit 22 and to produce an output signal corresponding to this position. This output signal is used to activate the transfer device 26 and the jaws 24 to properly approach and pick up the workpiece. If a successful pick up in achieved, the program control 82 is provided with an indication so that the remainder of the program can be carried out.

If this system is used in conjunction with a small computer and automatic assembly operations, it can be appreciated that those control and computation functions, represented to the left of line 110, can be advantageously performed by the computer while to the right thereof can be advantageously carried out by means of hard-wired circuitry. Again, it is to be understood that the particular nature and operation of an overall control system incorporating the sequence program of FIG. 9 is more fully set forth in the copending application Ser. No. 323,005.

The foregoing description is understood as being illustrative in nature and is not to be construed as limiting the invention.

The embodiments of the invention in which an exclusive property or privilege is claimed are defined as follows:

1. Appparatus for presenting selected parts from a plurality of storage locations to a terminal location comprising: part conveyance means directing parts received to said terminal location; support means; a plurality of storage bins removably disposed on the support means at spaced points adjacent said part conveyance means; a plurality of part transfer devices disposed on said support means over said bins and separately actuable for transferring parts from said bins to said conveyance means, each of said transfer devices including part pickup means and an actuator means for selectively displacing the pickup between a first position within a storage bin for part pickup and a second position over said part conveyance means for part release thereinto and control means for causing the pickup means to automatically cycle from the second position to the first position and back immediately after releasing a part onto said part conveyance means; said apparatus further including means maintaining each of said pickup means in said second position until a release signal is received from said control means to release a selected part onto said part conveyance means.

2. Apparatus as defined in claim 1 including signal generating means for applying a signal to the control means whenever the pickup means encounters a part in a bin, said control means being responsive to said signal to reverse the travel of the pickup and return to the second position.

3. Apparatus as defined in claim 2 wherein said signal generating means includes a limit switch operatively connected to the pickup means for sensing physical engagement of the pickup means with a part.

4. Apparatus as defined in claim 2 including switch means for generating a signal when the pickup means reaches the second position, and means for preventing the release of a part onto the conveyance until said signal is produced.

5. Apparatus as defined in claim 1 including load-sensitive means operatively connected to the pickup means for indicating the loaded and unloaded states of the pickup means during movement from the first to the second positions.

6. Apparatus as defined in claim 5 wherein the pickup means includes an electromagnet for picking up ferromagnetic parts.

7. Apparatus as defined in claim 5 wherein the pickup means includes a vacuum gripper, a vacuum source, and a fluid conduit connecting the source and gripper.

8. Apparatus as defined in claim 7 wherein the load sensitive means includes a pressure sensor operatively connected to said conduit for detecting a pressure rise as a result of contact between the gripper and a part.

9. Apparatus as defined in claim 1 wherein each of said transfer devices includes a pair of parallel cam plates mounted on the support means, a cam slot formed in each of the plates and extending from a first end position over the associated bin to a second end position over the conveyance, an actuator cylinder having an extensible output member mounted between the plates, part pickup means mounted on the output member and having cam follower means extending into the plate slots to guide the pickup between the first and second end positions when the cylinder is energized, the length of the output member being such as to locate the pickup in the bin when the cam follower means is in the first end position.

10. Apparatus as defined in claim 9 including a bin support member separate from and mounted on said support means, and means for shifting the bin support member relative to the support means between part transfer operations to cause the pickup to be projected to different parts of the bin.

11. Apparatus as defined in claim 10 including control means for preventing a bin shift until the pickup means cam follower is in the second end position.

12. Apparatus as defined in claim 10 including bearing means mounted on said support means, a shaft mounted on said bin support member and operatively connected with said bearing means for relative displacement thereto, said means for shifting comprising a fluid cylinder operatively connected between said bin support member and said support means and intermittently actuable for shifting said bin support member.

13. Apparatus as defined in claim 1 wherein said part conveyance is an inclined slide.

14. Apparatus as defined in claim 13 wherein said storage bins are disposed in tiers along said inclined slide.

* * * * *